(12) United States Patent
Bagheri et al.

(10) Patent No.: US 8,689,176 B2
(45) Date of Patent: Apr. 1, 2014

(54) MANAGEMENT OF TEMPLATE VERSIONS

(75) Inventors: Saeed Bagheri, Croton on Hudson, NY (US); Jarir K. Chaar, Tarrytown, NY (US); Yi-Min Chee, Yorktown Heights, NY (US); Feng Liu, Beijing (CN); Daniel V. Oppenheim, Croton on Hudson, NY (US); Krishna C. Ratakonda, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 13/105,084

(22) Filed: May 11, 2011

(65) Prior Publication Data
US 2012/0291007 A1  Nov. 15, 2012

(51) Int. Cl.
*G06F 9/44* (2006.01)
(52) U.S. Cl.
USPC ........... 717/106; 717/104; 717/105; 717/107; 717/108; 717/109; 717/110; 717/123; 717/125
(58) Field of Classification Search
None
See application file for complete search history.

(56) References Cited

U.S. PATENT DOCUMENTS

| | | | | |
|---|---|---|---|---|
| 6,199,195 | B1 * | 3/2001 | Goodwin et al. | 717/104 |
| 6,560,604 | B1 | 5/2003 | Fascenda | |
| 6,590,589 | B1 * | 7/2003 | Sluiman et al. | 715/751 |
| 7,178,101 | B2 | 2/2007 | Tunning | |
| 7,318,200 | B2 | 1/2008 | Maur et al. | |
| 7,734,995 | B1 | 6/2010 | Saikaly | |
| 7,933,930 | B1 * | 4/2011 | Bargas et al. | 707/802 |
| 8,370,233 | B2 * | 2/2013 | Kaisermayr et al. | 705/35 |
| 2002/0184233 | A1 * | 12/2002 | Schneider | 707/104.1 |
| 2004/0044987 | A1 * | 3/2004 | Kompalli et al. | 717/100 |
| 2006/0080082 | A1 * | 4/2006 | Ravindra et al. | 704/8 |
| 2006/0156278 | A1 * | 7/2006 | Reager | 717/104 |
| 2009/0157446 | A1 * | 6/2009 | McCreary | 705/7 |
| 2011/0023011 | A1 * | 1/2011 | Khader et al. | 717/106 |

OTHER PUBLICATIONS

Mendez-Nunez, S., and Gracián Triviño. "Combining semantic web technologies and computational theory of perceptions for text generation in financial analysis." Fuzzy Systems (FUZZ), 2010 IEEE International Conference on. IEEE, 2010.*

Szekely, Pedro, Ping Luo, and Robert Neches. "Beyond interface builders: model-based interface tools." Proceedings of the Interact'93 and CHI'93 Conference on Human Factors in Computing Systems. ACM, 1993.*

* cited by examiner

*Primary Examiner* — Don Wong
*Assistant Examiner* — Adam Conkey
(74) *Attorney, Agent, or Firm* — John R. Pivnichny; Law Office of Jim Boice

(57) ABSTRACT

A computer implemented method, system, and/or computer program product modifies a master template for an executable document. A version architecture comprises a master template for a master document, a new variation document that describes what changes are to be made to the master template for a specific context, and a resulting modified template based on the master template and rule-based instructions found in the new variation document. A processor defines an executable master document from the master template that, when executed, produces a final product. Specific rules set out conditions for modifying the master template for the specific context. These specific rules are used to define a new variation document, which is applied against the master template to generate a context-specific modified template. The context-specific modified template is then used to generate a context-specific executable document that, when executed, generates a final context-specific product.

15 Claims, 3 Drawing Sheets

MANAGEMENT OF TEMPLATE VERSIONS

BACKGROUND

The present disclosure relates to the field of computers, and specifically to the use of computers in the field of executing processes that are defined by templates. Still more particularly, the present disclosure relates to modifying templates that are used for executing processes.

Processes are defined by templates by domain experts and are carefully fine-tuned over time. Certain processes are large and complex, with many levels of tasks and detail. Over time, new versions of the templates are made based on experience and lessons learned. However, since changes are carefully controlled by a committee, creating a new version is a not trivial exercise.

BRIEF SUMMARY

A computer implemented method, system, and/or computer program product modifies a master template for an executable document. A version architecture comprises a master template for a master document, a new variation document that describes what changes are to be made to the master template for a specific context, and a resulting modified template based on the master template and rule-based instructions found in the new variation document. A processor defines an executable master document from the master template that, when executed, produces a final product. Specific rules set out conditions for modifying the master template for the specific context. These specific rules are used to define a new variation document, which is applied against the master template to generate a context-specific modified template. The context-specific modified template is then used to generate a context-specific executable document that, when executed, generates a final context-specific product.

DETAILED DESCRIPTION

Figure 1:
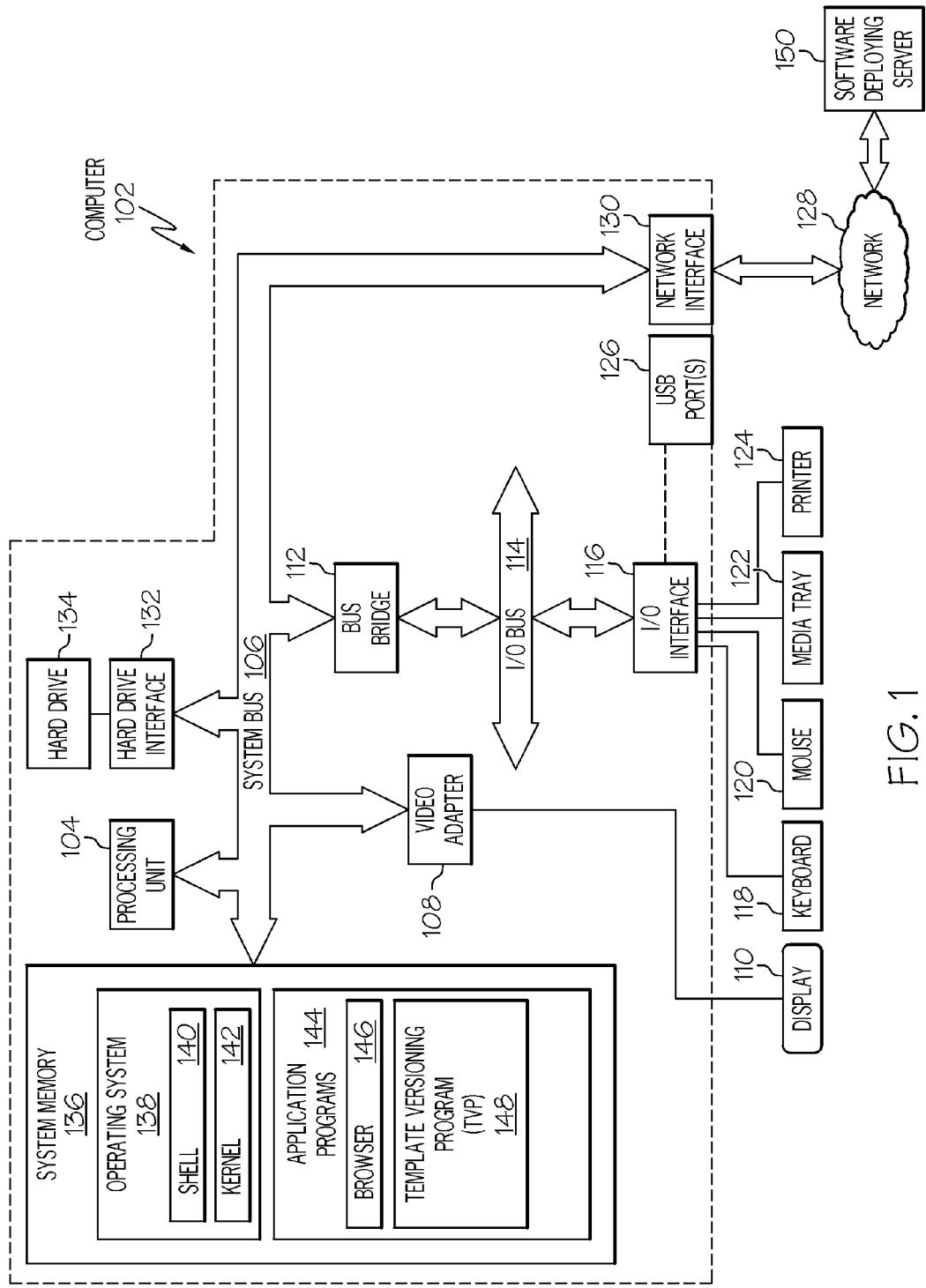
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150.

Computer 102 includes a processing unit 104 that is coupled to a system bus 106. Processing unit 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a template versioning program (TVP) 148. TVP 148 includes code for implementing the processes described below, including those described in FIGS. 2-3. In one embodiment, computer 102 is able to download TVP 148 from software deploying server 150, including in an on-demand basis, wherein the code in TVP 148 is not downloaded until needed for execution to define and/or implement the improved enterprise architecture described herein. Note further that, in one embodiment of the present invention, software deploying server 150 performs all of the functions associated with the present invention (including execution of TVP 148), thus freeing computer 102 from having to use its own internal computing resources to execute TVP 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

This invention relates to managing versions of structured business documents, such as process Templates. In particular, this invention describes a method to create multiple variations of a given document version to reflect the fact that a variation is functionally identical, from the business perspective, to its owning version but has context-specific changes, such as for use in a different geography or by a specific organization.

The present disclosure presents a method and system for versioning management of business process templates of business structured documents in order to generate rule-based template versions that are functionally equivalent, or in some embodiments functionally identical, to a master template from which the rule-based template versions are derived.

As used herein, a process template P is of type t for a version i. Thus, P(t, i) is a master version of a specific process template. The present invention extends the structure of this document model to obtain the combination of a master document template and many variations, each of which is functionally equivalent/identical to the master document template. A specific variation template is referenced as P(t, i, v), which denotes a particular version that has some changes that adapt it for use in a specific business or customer context.

The present invention also extends the master structure document to (1) include additional elements that will only be used by one or more modified versions of the original master template; and (2) include rules that specify what elements of the master document may be omitted or added to different versions in different contexts (i.e., what changes are permissible in a particular modified version of the master template). Thus, the present invention teaches a new document structure for defining a variation template. As stated above, this variation template has a different structure than the master. However, the business rules ensure that document(s) produced from the new variation template will be, from a business perspective, equivalent/identical to documents produced by the original master template.

Figure 2:
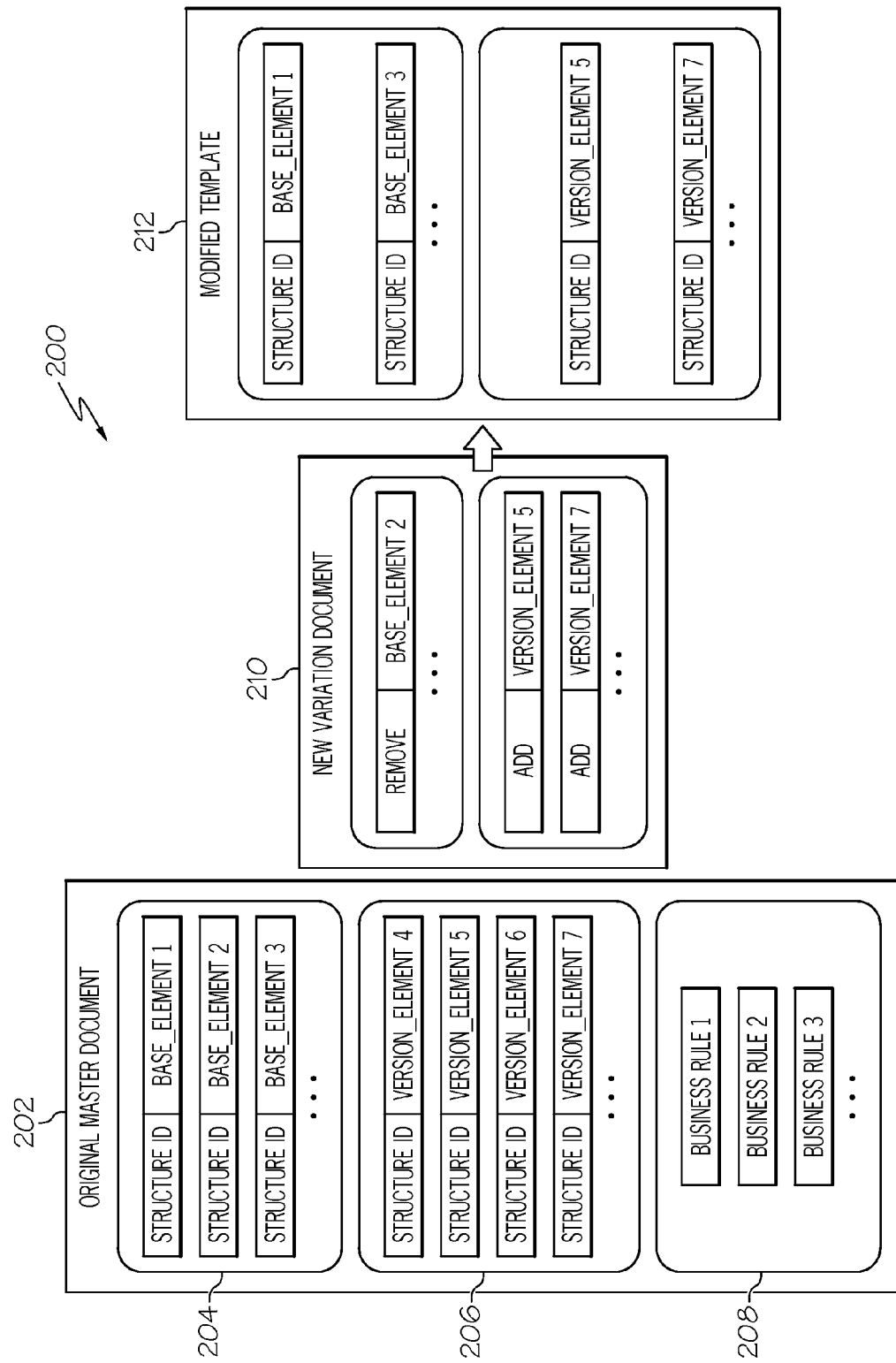
FIG. 2 illustrates a master document used to create a particular version of a master template.

With reference now to FIG. 2, a version architecture 200 used to create a particular version of a master template is presented. Note that the master document 202 contains multiple base elements, which collectively make up the original master template 204. These base elements (shown as Base_Elements 1-3, although there may be "n" number of base elements, where "n" is any integer) describe/define the fundamental components of a document that, when executed, performs a particular business function. For example, Base_Element 1 may be a extensible markup language (XML) document that can be executed to create a spreadsheet, Base_Element 2 may be an XML document that can be executed to create a graph from data in the spreadsheet, and Base_Element 3 may be an XML document that can be executed to generate an e-mail message that contains the spreadsheet and graph generated by Base_Elements 1 and 2. In accordance with the present invention, any variation to this master template 204 will result in a modified template that generates functionally equivalent, if not identical, documents as those generated by the original master template 204.

Also within the original master document 202 are additional document version-elements 206 to be used by any v value (for any variation). That is, document version-elements 206 are utilized as add-ons to the original master template 204, according to instructions found in business rules 208. These business rules 208 determine what changes to the original master template 204 are permissible for a particular version. For example, as defined in new variation document 210, certain base elements (e.g., Base_Element 2) of the original master template 204 can be removed, while document version-elements 206 (e.g., Version_Element 5 and Version_Element 7) can be added, according to one or more of the business rules 208 that are applicable for a particular customer, project, environment, language, etc. These changes found in the new variation document 210, when executed, result in the creation of a modified template 212, which is used as a template for generating an executable document (e.g., XML code) that performs the same function as the master document generated from the original master template 204.

Examples of the business rules 208 include, but are not limited to, 1) describing what language is to be used in the executable code derived from the template; 2) describing what human language is to be used in the final product produced by the document that the template described; 3) defining what date/time formats are to be used in the template, document, and/or final product resulting from execution of the document; etc. Thus, although there may be minor variations between the templates/documents, the rules ensure that each variation is functionally identical to the master.

Figure 3:
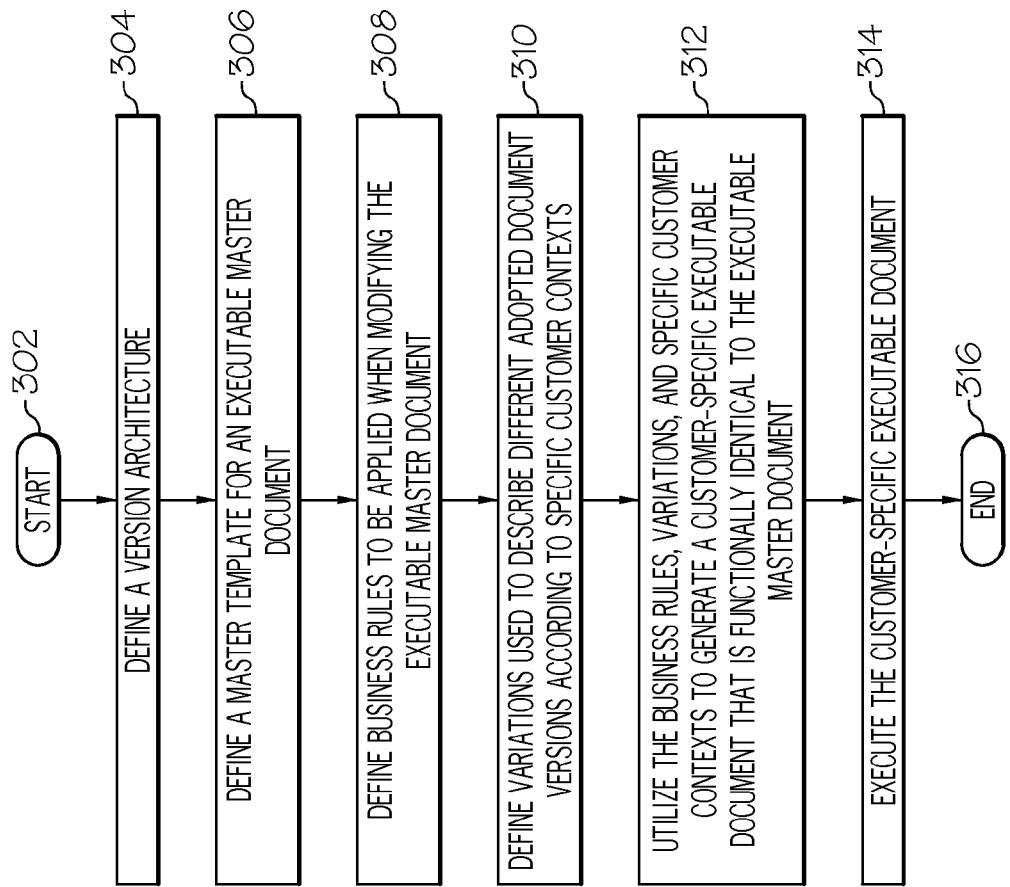
FIG. 3 is a high level flow chart of one or more exemplary steps performed by a processor to create new template versions that are functionally equivalent to an original master template.

With reference now to FIG. 3, a high level flow chart of one or more exemplary steps taken by a processor to modify a master template is presented. After initiator block 302, a version architecture (e.g., version architecture 200 shown in FIG. 2) is defined (block 304). This version architecture includes a master document that includes a master template, a new variation document that describes what changes are to be made to the master template for a specific context (e.g., a particular customer selected from a plurality of customers, a particular language, a particular monetary denomination, a particular time/date convention, etc.), and a resulting modified template based on the master template and rule-based instructions found in the new variation document (all described in FIG. 2).

As described in block 306, a master template for an executable master document is defined. This master template defines all features found in an executable master document that, when executed, produces a final product (e.g., a spreadsheet, a graph, a text document, etc.), which fulfills the requirements of a certain predefined business function. For example, the master template may define an executable master document that, when executed, produces a payroll report, a sales projection, a profit and loss statement, etc. This report will be functionally the same even after being modified by the process described herein.

With reference then to block 308, business rules are defined. These business rules set out conditions for modifying the master template for a specific context, such as a particular purpose/customer/environment/etc. in which a final context-specific product will be utilized. For example, a business rule may state what language is to be used in the final product, what monetary denominations should be used in the final product, etc. As described in block 310, variations (e.g., as shown in the new variation document 210 in FIG. 2) are then defined according to the rules for a particular project/customer/etc. As described in block 312, a context-specific executable document is then generated by applying these variations to the original master template. That is, the variations describe which variations are to be applied to the master template in order to create the new modified template. This new modified template, which is customer/context specific, is then used to generate the context-specific executable document. When executed, this context-specific executable document generates a final context-specific product (e.g., a report, graph, etc.) that is functionally equivalent to, if not identical to, the final product that was generated by executing the original executable master document. The process ends at terminator block 316.

As defined herein, the terms "functionally equivalent" and/or "functionally identical" mean that the two templates/documents described herein have the same fundamental functionality, even if implemented in context-specific ways. For example, assume that the fundamental functionality is to send out bills to customers. If the bills are going out to hospital patients, then the U.S. Health Insurance Portability and Accountability Act (HIPAA) may mandate that details about the services that were rendered are redacted from the patient's bill, in order to ensure his/her privacy. However, the fundamental functionality of the process (sending out a bill) has not changed, even if the template/document has been modified to protect the patient's privacy.

Similarly, certain European Union (EU) regulations prevent certain corporate financial information from leaving EU countries. Thus, a template/program for generating a corporate annual report may be modified to redact such proscribed information from being published in reports destined for non-EU countries by using inputs that are less specific (e.g., financially detailed). For example, rather than incorporate detailed profit/loss statements into the annual report, non-EU bound reports may provide less detailed information (e.g., ranges) that nonetheless result in the generation of an annual report that serves the same function (providing information regarding the financial health of the company). Thus, the fundamental functionality of the template/program (generating an annual report) remains the same.

In one embodiment, the template/document is functionally equivalent even if implemented by different hardware. For example, a billing report may be designed for one operating system (OS) and/or application program in the master template/document, while being modified to run on another OS/application program when modified by the rules described herein. Similarly, a system designed to run on a Wi-Fi system in the master template/document may be modified to run on a cellular phone network, while still retaining the same fundamental functionality (e.g., browsing the web, etc.) as the master.

In one embodiment, the master template/document may be modified according to how many users will be using the final product. For example, assume that the master template/document was designed to allow 5 users to access information from a database. The rules/modifications described herein may modify the master template/document such that 500 users are able to access the same information from the same database. Thus, the basic functionality of the final product is the same (accessing certain data from a specific database), whether derived from the master template/document or the modified template/document.

Thus, functionally equivalent/identical templates/documents are those that perform a same function (billing, annual reports, equipment monitoring, etc.), even though different inputs/outputs may result.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method of modifying a master template, the computer implemented method comprising:
    a processor defining a version architecture, wherein the version architecture comprises an original master template for an original executable master document, a new variation document that describes what changes are to be made to the original master template for a specific context, and a resulting modified template based on the original master template and rule-based instructions found in the new variation document;
    the processor defining the original executable master document, wherein the original executable master document is defined by the original master template, and wherein the original master template defines all features found in the original executable master document that, when executed, produces a final product;
    the processor defining specific rules for the specific context, wherein the specific rules set out conditions for modifying the original master template for the specific context;
    the processor utilizing the specific rules for the specific context to define a new variation document, wherein the new variation document describes rule-based variations to be implemented against the original master template for the specific context;
    the processor applying the new variation document to the original master template to generate a new modified template, wherein the new modified template is context-specific;
    the processor generating a context-specific executable document from the new modified template; and
    the processor executing the context-specific executable document to generate a final context-specific product that is functionally identical to the final product produced by the original executable master document, wherein the specific context is defined according to which person from a plurality of persons will be utilizing the final context-specific product, wherein the original executable master document and the final context-specific product are both financial reporting products, and wherein the final context-specific product produces a same financial report as the original executable master document while complying with a governmental regulation.

2. The computer implemented method of claim 1, further comprising:
    the processor further defining the specific context as the final context-specific product running on a cellular phone network rather than a Wi-Fi system used by the original executable master document.

3. The computer implemented method of claim 1, further comprising:
the processor further defining the specific context as the final context-specific product permitting a higher quantity of users to use the final product compared to a lower quantity of users that were permitted to use the original executable master document.

4. The computer implemented method of claim 1, further comprising:
the processor defining a particular monetary denomination that will be utilized in the final context-specific product.

5. The computer implemented method of claim 1, further comprising:
the processor defining a particular time/date convention that will be utilized in the final context-specific product.

6. A computer program product for modifying a master template, the computer program product comprising:
a non-transitory computer readable storage media;
first program instructions to define a version architecture, wherein the version architecture comprises an original master template for an original executable master document, a new variation document that describes what changes are to be made to the original master template for a specific context, and a resulting modified template based on the original master template and rule-based instructions found in the new variation document;
second program instructions to define the original executable master document, wherein the original executable master document is defined by the original master template, and wherein the original master template defines all features found in the original executable master document that, when executed, produces a final product;
third program instructions to define specific rules for the specific context, wherein the specific rules set out conditions for modifying the original master template for the specific context;
fourth program instructions to utilize the specific rules for the specific context to define a new variation document, wherein the new variation document describes rule-based variations to be implemented against the original master template for the specific context;
fifth program instructions to apply the new variation document to the original master template to generate a new modified template, wherein the new modified template is context-specific;
sixth program instructions to generate a context-specific executable document from the new modified template; and
seventh program instructions to execute the context-specific executable document to generate a final context-specific product that is functionally identical to the final product produced by the original executable master document, wherein the specific context is defined according to which person from a plurality of persons will be utilizing the final context-specific product, wherein the original executable master document and the final context-specific product are both financial reporting products, and wherein the final context-specific product produces a same financial report as the original executable master document while complying with a governmental regulation; and wherein
the first, second, third, fourth, fifth, sixth, and seventh program instructions are stored on the non-transitory computer readable storage media.

7. The computer program product of claim 6, further comprising:
eighth program instructions to define the specific context according to which customer from a plurality of customers will be utilizing the final context-specific product; and wherein the eighth program instructions are stored on the non-transitory computer readable storage media.

8. The computer program product of claim 6, further comprising:
eighth program instructions to defining a particular language that will be utilized in the final context-specific product; and wherein
the eighth program instructions are stored on the non-transitory computer readable storage media.

9. The computer program product of claim 6, further comprising:
eighth program instructions to defining a particular monetary denomination that will be utilized in the final context-specific product; and wherein
the eighth program instructions are stored on the non-transitory computer readable storage media.

10. The computer program product of claim 6, further comprising:
eighth program instructions to defining a particular time/date convention that will be utilized in the final context-specific product; and wherein
the eighth program instructions are stored on the non-transitory computer readable storage media.

11. A computer system comprising:
a central processing unit (CPU), a computer readable memory, and a computer readable storage media;
first program instructions to define a version architecture, wherein the version architecture comprises an original master template for an original executable master document, a new variation document that describes what changes are to be made to the original master template for a specific context, and a resulting modified template based on the original master template and rule-based instructions found in the new variation document;
second program instructions to define the original executable master document, wherein the original executable master document is defined by the original master template, and wherein the original master template defines all features found in the original executable master document that, when executed, produces a final product;
third program instructions to define specific rules for the specific context, wherein the specific rules set out conditions for modifying the original master template for the specific context;
fourth program instructions to utilize the specific rules for the specific context to define a new variation document, wherein the new variation document describes rule-based variations to be implemented against the original master template for the specific context;
fifth program instructions to apply the new variation document to the original master template to generate a new modified template, wherein the new modified template is context-specific;
sixth program instructions to generate a context-specific executable document from the new modified template; and
seventh program instructions to execute the context-specific executable document to generate a final context-specific product that is functionally identical to the final product produced by the original executable master document, wherein the specific context is defined according to which person from a plurality of persons will be utilizing the final context-specific product, wherein the original executable master document and the final context-specific product are both financial reporting products, and wherein the final context-specific product produces a same financial report as the original executable master document while complying with a governmental regulation; and wherein the first, second, third, fourth, fifth, sixth, and seventh program instructions are stored on the computer readable storage media for execution by the CPU via the computer readable memory.

12. The computer system of claim 11, further comprising:

eighth program instructions to define the specific context according to which customer from a plurality of customers will be utilizing the final context-specific product; and wherein the eighth program instructions are stored on the computer readable storage media for execution by the CPU via the computer readable memory.

13. The computer system of claim 11, further comprising:

eighth program instructions to defining a particular language that will be utilized in the final context-specific product; and wherein the eighth program instructions are stored on the computer readable storage media for execution by the CPU via the computer readable memory.

14. The computer system of claim 11, further comprising:

eighth program instructions to defining a particular monetary denomination that will be utilized in the final context-specific product; and wherein the eighth program instructions are stored on the computer readable storage media for execution by the CPU via the computer readable memory.

15. The computer system of claim 11, further comprising:

eighth program instructions to defining a particular time/date convention that will be utilized in the final context-specific product; and wherein the eighth program instructions are stored on the computer readable storage media for execution by the CPU via the computer readable memory.

* * * * *